(12) United States Patent
Bayart et al.

(10) Patent No.: US 7,283,711 B2
(45) Date of Patent: Oct. 16, 2007

(54) DOUBLE-CLAD PHOTONIC OPTICAL FIBER

(75) Inventors: Dominique Bayart, Clamart (FR); Laurent Berthelot, Orsay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/098,128

(22) Filed: Mar. 15, 2002

(65) Prior Publication Data
US 2002/0131742 A1 Sep. 19, 2002

(30) Foreign Application Priority Data
Mar. 16, 2001 (FR) .................................. 01 03640

(51) Int. Cl.
*G02B 6/20* (2006.01)
(52) U.S. Cl. ...................... 385/125; 385/127
(58) Field of Classification Search ......... 385/125–127
See application file for complete search history.

(56) References Cited

U.S. PATENT DOCUMENTS

| | | | | |
|---|---|---|---|---|
| 5,155,792 A | * | 10/1992 | Vali et al. .................... | 385/125 |
| 5,471,553 A | * | 11/1995 | Teshima ...................... | 385/125 |
| 5,570,448 A | * | 10/1996 | Imoto et al. ................. | 385/126 |
| 5,799,125 A | * | 8/1998 | Inagaki et al. ............... | 385/127 |
| 5,802,236 A | * | 9/1998 | DiGiovanni et al. ......... | 385/127 |
| 5,907,652 A | * | 5/1999 | DiGiovanni et al. ......... | 385/125 |
| 6,097,870 A | * | 8/2000 | Ranka et al. ................. | 385/127 |
| 6,115,526 A | * | 9/2000 | Morse ......................... | 385/125 |
| 6,334,019 B1 | * | 12/2001 | Birks et al. .................. | 385/125 |
| 6,400,877 B1 | * | 6/2002 | Kato et al. ................... | 385/123 |
| 6,418,258 B1 | * | 7/2002 | Wang .......................... | 385/125 |
| 6,571,045 B2 | * | 5/2003 | Hasegawa et al. ........... | 385/125 |
| 6,614,974 B2 | * | 9/2003 | Elrefaie et al. .............. | 385/125 |
| 6,792,188 B2 | * | 9/2004 | Libori et al. ................. | 385/125 |
| 2002/0048441 A1 | * | 4/2002 | Lemaire et al. .............. | 385/127 |
| 2002/0067904 A1 | * | 6/2002 | Lemaire et al. .............. | 385/127 |
| 2002/0114602 A1 | * | 8/2002 | Tardy et al. ................. | 385/123 |
| 2002/0172481 A1 | * | 11/2002 | Kubota et al. ............... | 385/123 |

(Continued)

FOREIGN PATENT DOCUMENTS

EP    0 905 834 A2    3/1999

(Continued)

OTHER PUBLICATIONS

T. Sondergaard, "Photonic Crystal Distributed Feedback Fiber Lasers with Bragg Gratings" Journal Of Lightwave Technology, IEEE, NY, US, vol. 18, No. 4, Apr. 2000 pp. 589-597, XP000989283.

(Continued)

*Primary Examiner*—Ellen E. Kim
(74) *Attorney, Agent, or Firm*—Sughrue Mion Pllc.

(57) ABSTRACT

The invention proposes a double-clad photonic optical fiber presenting:
- a fiber core, first cladding surrounding the fiber core, and second cladding surrounding the first cladding;
- at least one hole in the fiber core; and
- doping using a rare earth ion, at least in the core of the fiber.

The invention makes it possible to obtain a double-clad fiber with good overlap between the signal and a pump injected into the core. It improves amplification efficiency in double-clad optical amplifiers where the signal is injected into the core of the fiber and the pump into the first cladding.

20 Claims, 16 Drawing Sheets

U.S. PATENT DOCUMENTS

2003/0108318 A1* 6/2003 Arai et al. .................. 385/127
2004/0240819 A1* 12/2004 Shima et al. ............... 385/126

FOREIGN PATENT DOCUMENTS

| EP | 1 043 816 A2 | 10/2000 |
|---|---|---|
| EP | 1118887 A2 | 7/2001 |
| JP | 2000 035521 | 2/2002 |

OTHER PUBLICATIONS

Wadsworth et al, "Yb3+-doped photonic crystal fibre laser", Electronics Letters, vol. 36, No. 17, Aug. 17, 2000, pp. 1452-1454, XP006015581.

R. F. Cregan et al, "Distribution of Spontaneous Emission from an ER3+-Doped Photonic Crystal Fiber", Journal Of Lightwave Technology, IEEE, NY, US, vol. 17, No. 11, Nov. 1999, pp. 2138-2141, XP001033280.

* cited by examiner

FIG_2

FIG_3

FIG_4

FIG_5

FIG_6

FIG_7

FIG_8

FIG_9

FIG_10

FIG_11

FIG_12

FIG_13

FIG_14

FIG_15

DOUBLE-CLAD PHOTONIC OPTICAL FIBER

The present invention relates to the field of transmission by optical fiber, and more specifically it relates to double-clad photonic optical fibers as used to amplify signals optically.

BACKGROUND OF THE INVENTION

The refractive index profile of an optical fiber is generally descried in terms of the appearance of a graph plotting the refractive index of the fiber as a function of radius. In conventional manner, the distance r to the center of the fiber is plotted along the abscissa axis, and the difference between the refractive index at that distance and the refractive index of the fiber cladding is plotted up the ordinate axis. Index profiles are thus described as being "step-shaped", "trapezium-shaped", or "triangular" for graphs that are respectively step-shaped, trapezium-shaped, or triangular in appearance. These curves generally represent a theoretical or reference profile for a fiber, and fiber manufacturing constraints can lead to a profile that departs perceptibly therefrom. Index variation along the profile is used to control light propagation along the fiber.

So-called "photonic" or "photonic crystal" fibers (PCF) have recently appeared: unlike conventional fibers, these fibers are not entirely constituted by a transparent solid material such as doped silica; in section, a photonic fiber presents a plurality of air holes. These holes are parallel to the axis of the fiber, and they extend longitudinally along the fiber. In practice, the holes can be obtained by making the preform by assembling capillary tubes and cylinders of silica to build up the pattern of holes to be obtained in the fiber. Drawing down such a preform provides a fiber with holes corresponding to the capillary tubes.

The presence of these holes in the fiber material gives rise to variations in the mean index of the material; as in a conventional optical fiber, these index variations can be used for guiding light signals at appropriate wavelengths. A description of such photonic fibers is to be found in WO-A-00 49 435: in addition to describing the principle on which photonic fibers operate, that document also describes a method enabling such fibers to be assembled, with hole diameter varying longitudinally. The index profile of the fibers is not specified; the application mentions that the variations in mode diameter caused by the longitudinal variations in the sizes of the holes can be used in optical amplifiers.

R. F. Cregan et al. in "Distribution of Spontaneous Emission from an $Er^3$-doped Photonic Crystal Fiber", Journal of Lightwave Technology, Vol. 17, No. 11, November 1999, investigates spontaneous emission in a photonic fiber. The air holes are distributed in a triangular matrix, the fiber being hexagonal in shape; in the center of the hexagon, the fiber does not present a hole, and the silica is doped with erbium. That document studies the three-dimensional distribution of spontaneous emission while the fiber is being pumped axially; it shows that the distribution is a function of how the holes are distributed in the fiber, in agreement with simulation. No reference is made to any use for the doped fiber.

Thomas Sondergaard, in "Photonic Crystal Distributed Feedback Fiber Lasers with Bragg Gratings", Journal of Lightwave Technology, Vol. 18 No. 4, April 2000, discusses the use of photonic fibers for making fiber lasers; he states that the mode areas for the signal or for the pump can be smaller than or greater than the corresponding mode areas in conventional step index fibers. The use of photonic fibers thus makes it possible to make lasers having a low pumping threshold (for small mode areas), or to make high power lasers (for large mode areas). That document mentions digital simulations only, and does not describe any practical embodiments.

W. J. Wadsworth et al. in "$Yb^{3+}$-doped Photonic Crystal Fiber Laser", Electronics Letters, Vol. 36 NO. 17, August 2000, demonstrates a laser effect experimentally in a photonic fiber; the fiber is made taking a silica tube doped with Yb and codoped with Al and surrounding it with capillaries of pure silica; the assembly is then drawn down to form a fiber, and a sleeve of pure silica is placed around it. Two rows of holes surround the doped core, and light is strongly confined in the doped core of the fiber.

EP-A-1 043 816 describes a double-clad fiber; the signal travels in the doped core of the fiber, and a pump is injected into the first cladding; the effect of the second cladding is to confine the pumping light within the first cladding. In order to direct the pumping light towards the doped core, proposals are made to provide regions of modified index in the first cladding. Those regions of modified cladding can be constituted in particular by air holes. In one embodiment, three modified index regions are provided that are distributed around the periphery of the first cladding. In another embodiment, six modified index regions are provided at the vertices and at the middles of the sides of an equilateral triangle. It is suggested that the modified index regions should be disposed as far away as possible from the core of the fiber in order to avoid modifying polarization within the core of the fiber.

OBJECTS AND SUMMARY OF THE INVENTION

The problem of the invention is to improve the efficiency of double-clad optical amplifiers in comparison with the solution proposed in EP-A-1 043 816. Thus, in one embodiment, the invention proposes distributing holes in a double-clad photonic fiber not only within the first cladding, but also within the core of the fiber.

More precisely, the invention proposes a double-clad photonic optical fiber, presenting:
- a fiber core, first cladding surrounding the fiber core, and second cladding surrounding the first cladding;
- at least one hole in the fiber core; and
- doping using a rare earth ion, at least in the core of the fiber.

In an embodiment, the fiber presents a plurality of holes in the core and in the first cladding.

Preferably, the mode diameter of a signal injected into the fiber core is greater than the diameter of the core.

The doping may extend in a disk, or indeed in a ring. In which case, the ring preferably covers the interface between the fiber core and the first cladding.

The holes may be disposed in a triangular matrix of points; there need not be any hole provided on the axis of the fiber. It is also possible to provide for the holes to be of size that increases with increasing distance from the axis of the fiber.

The invention also provides an amplifier comprising such a fiber and at least one pump injected into the first cladding. Finally, the invention proposes a fiber laser comprising such a fiber and at least one pump injected into the first cladding.

BRIEF DESCRIPTION OF THE DRAWINGS

Other characteristics and advantages of the invention will appear on reading the following description of embodiments of the invention, given by way of the example and with reference to the accompanying drawings, in which.

MORE DETAILED DESCRIPTION

In a double-clad fiber, the invention proposes providing holes not only in the first cladding, but also in the core of the fiber; this makes it possible to improve overlap between the signal and the pump. The solution proposed by the invention goes against the teaching of document EP-A-1 043 816, in which it is proposed that the holes should be located outside the cladding. The solution proposed in that document is intended to deflect towards the fiber core those rays of pumping light that are propagating in the vicinity of the interface between the first cladding and the second cladding. In contrast, the solution proposed in the present invention relies on a completely different technical effect: the effect of the holes in the cladding and in the core is to increase the mode diameter of the signal and the overlap between the signal and the pump.

The holes in the fiber are located at least in the core of the fiber; the effect of the holes is to increase the mode diameter of the signal injected into the core of the fiber; this improves overlap between the signal and a pump injected into the cladding.

Figure 1:
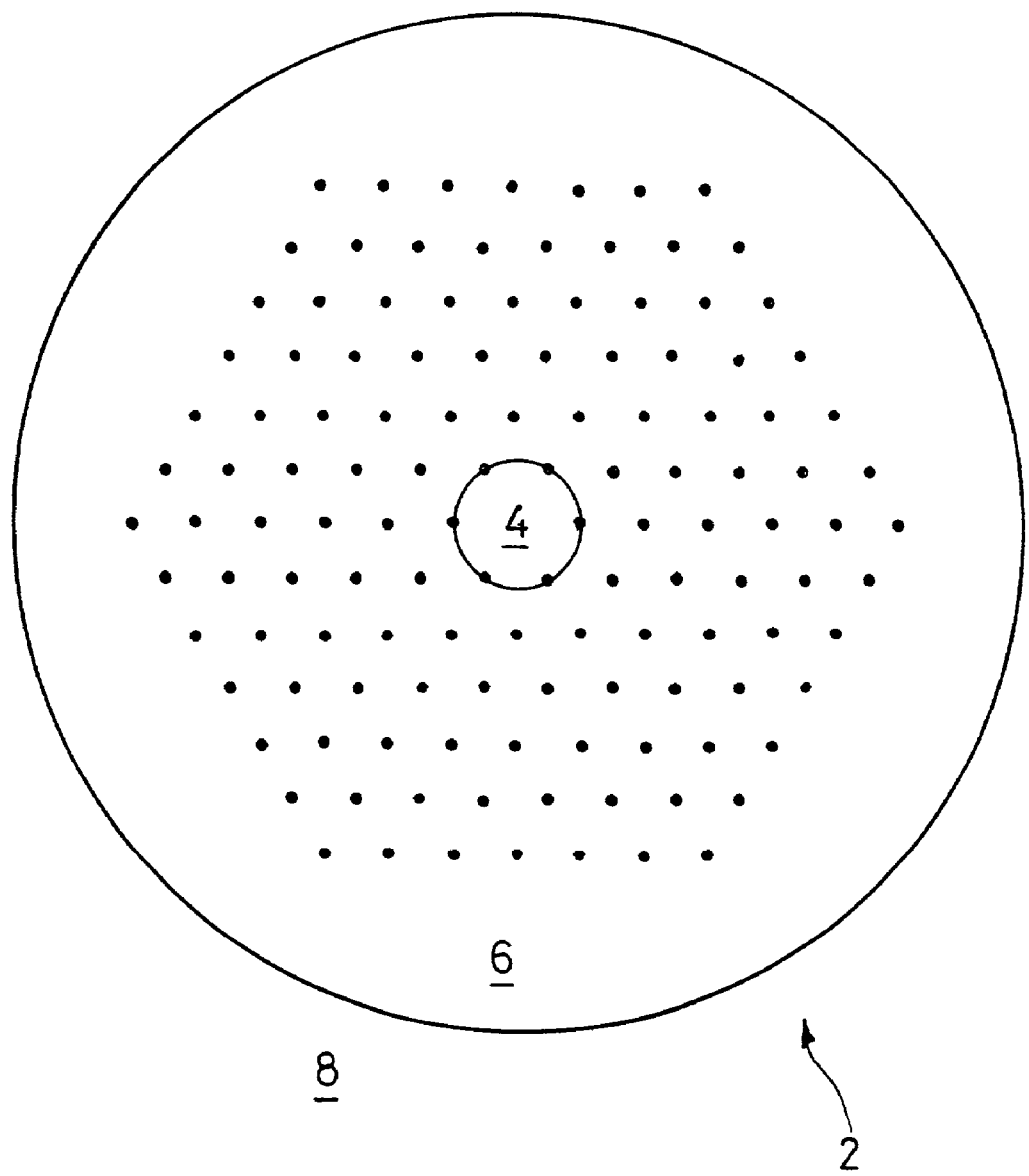
FIG. 1 is a diagrammatic section of a photonic optical fiber constituting an embodiment of the invention.

FIG. 1 is a diagrammatic section of a photonic optical fiber constituting an embodiment of the invention. In this example, the fiber 2 presents a fiber core 4, first cladding 6 surrounding the fiber core, and second cladding 8 surrounding the first cladding; the outer edge of the second cladding is not shown in the figure. These various portions of the fiber are defined in conventional manner in terms of index difference between the core and the first cladding, and also in terms of index difference between the first cladding and the second cladding. The fiber core can thus be seen as the portion of the fiber which occupies the center of the fiber, and which is defined by its interface with the first cladding, i.e. by a drop in the index profile. Similarly, the first cladding is the portion of the fiber that lies outside said first interface and that extends as far as a second interface with the second cladding, i.e. to a second drop in the index profile.

The FIG. 1 fiber is doped by means of at least one rare earth ion, presenting an atomic number in the range 57 to 71. It is possible, in particular, to use erbium, ytterbium, germanium, or the other elements that are well known as being suitable for use in optical amplifiers. It is also possible to provide for codoping with other dopants such as aluminum, phosphorous, or indeed cerium; these elements can serve to cause the respective indices of the core to vary, to induce spectral modifications in gain, or in non-radiative de-excitation rate. An erbium concentration of about 1000 parts per million (ppm) by weight is suitable for a fiber that is to be used as an erbium-doped amplifier; ytterbium codoping can also be provided, with ytterbium concentrations lying in the range 5000 ppm to 20000 ppm by weight. If the fiber is to be used as a laser, it is also possible to use doping with ytterbium alone, at a concentration in the vicinity of 2000 ppm. Pumping wavelengths are typically about 970 nanometers (nm) to 985 nm with erbium doping, and in the vicinity of 915 nm with ytterbium doping.

The location of the rare earth doping within the fiber can vary in different embodiments; it is possible for only the core of the fiber to be doped; nevertheless, insofar as the presence of holes in the fiber has the effect of increasing the mode diameter of the signal to beyond the fiber core, it can be advantageous for the doping also to extend at least some of the way into the first cladding; this makes it possible to improve amplification efficiency in the fiber. It is also possible to dope the fiber in a ring configuration extending in part over the outer portion of the monomode core, and in part over the first cladding adjacent to the monomode core. The ring then advantageously covers the interface between the monomode core and the first cladding.

The figure also shows that the fiber is a photonic fiber, i.e. that it has holes which extend longitudinally. At least one hole is provided in the fiber, and preferably more than one hole. The holes are located at least in part in the core of the fiber, and they have the effect of increasing the mode diameter of the signal injected into the fiber core. In the example of FIG. 1, as in all the other examples, the holes are located at the points of a triangular matrix; the term "matrix" is used to designate all of the possible locations for holes in the photonic fiber; insofar as the fiber preform is made by assembling together capillary tubes and solid cylinders, this "matrix" is defined by the disposition of tubes and cylinders within the preform. In the example of a triangular matrix, the tubes and cylinders are disposed in rows, with two adjacent rows being offset by a distance that corresponds to the distance between two adjacent tubes or cylinders within a row. Other forms of matrix are possible, e.g. a square matrix. In all cases, the matrix is constituted by a set of points, at each of which there may optionally be provided a hole.

In the example of FIG. 1, the holes are disposed in a triangular matrix occupying a hexagon; no hole is provided in the center of the fiber. The distribution of holes within the fiber can be different from this example.

Figure 7:
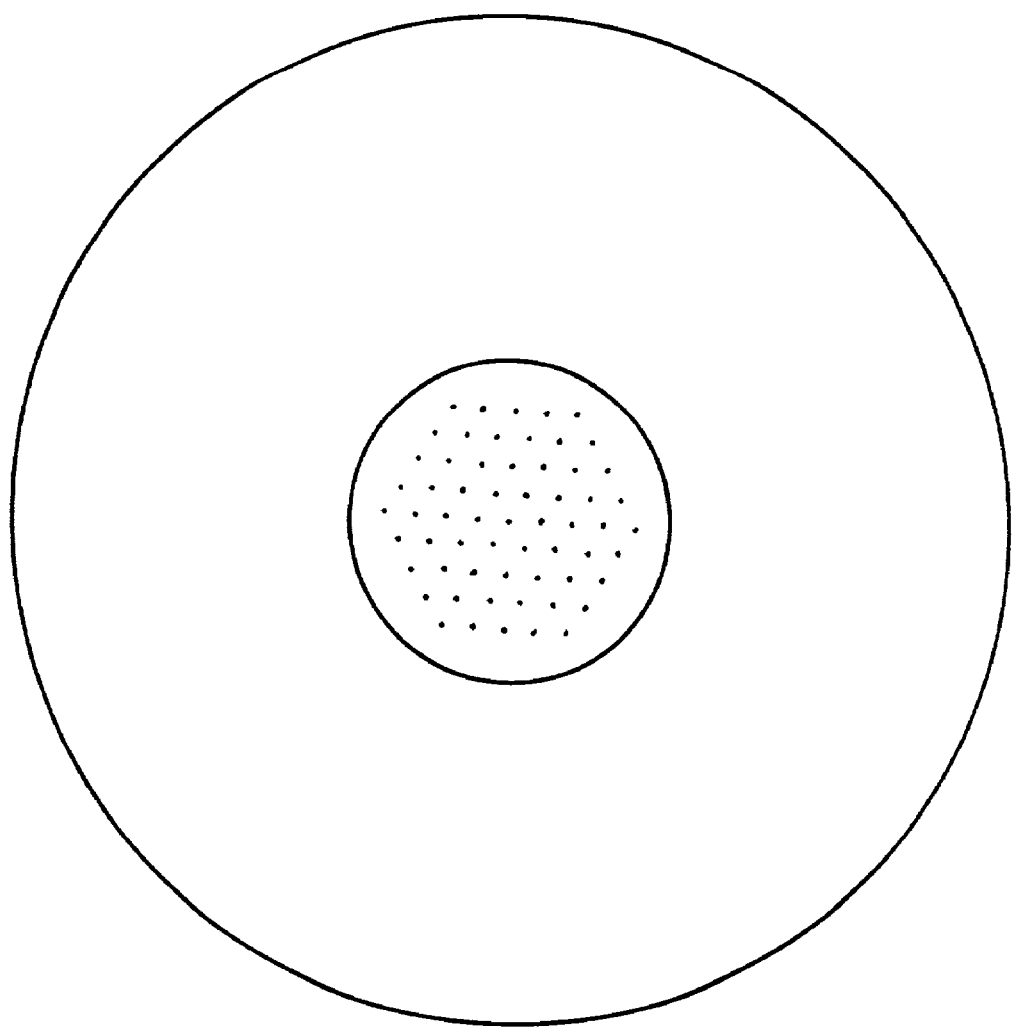
Figure 13:
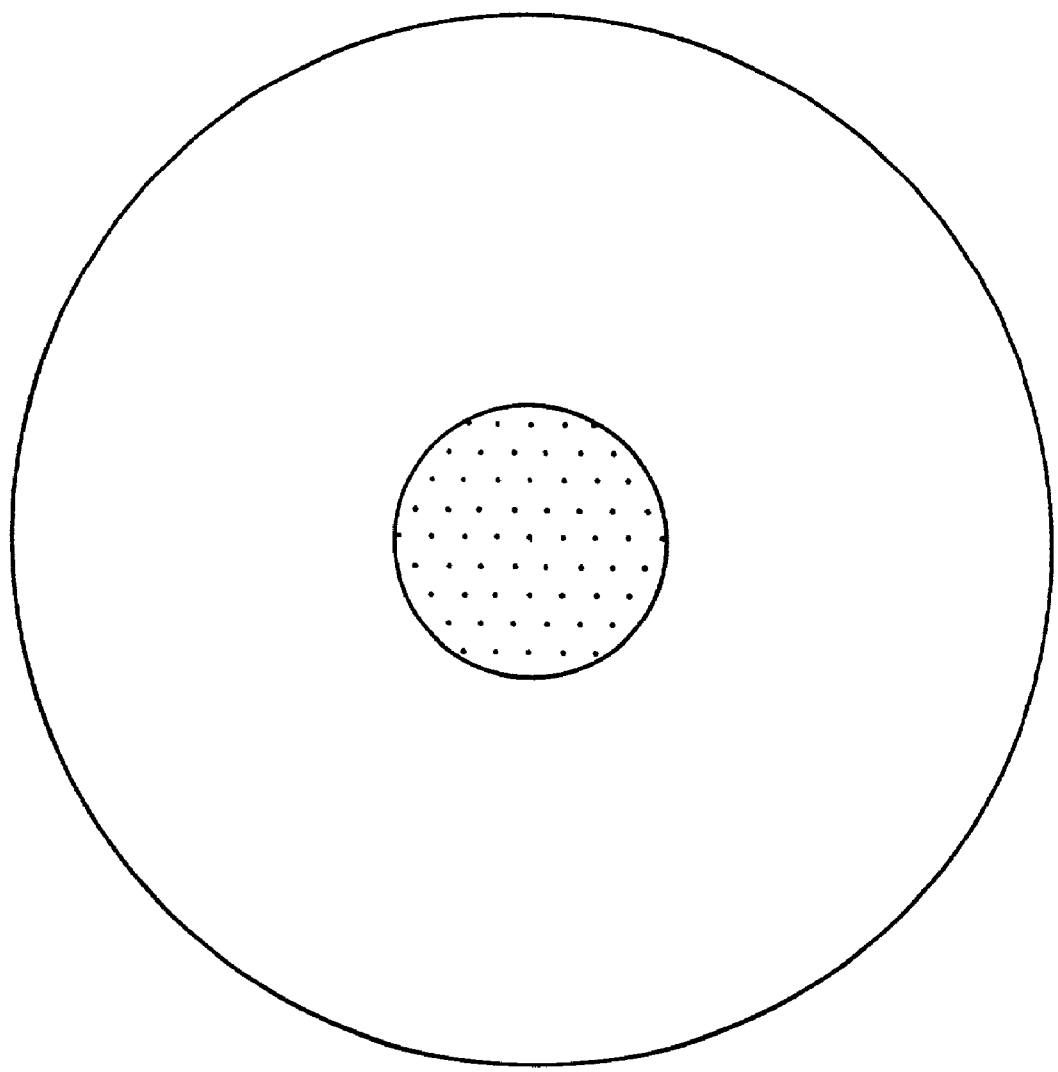

The holes may occupy solely the core of the fiber, as in the examples of FIGS. 7 and 13. In which case, they serve to increase the diameter of the core, which nevertheless remains monomode for the signal, thereby increasing mode diameter. In other words, with a large-diameter core, the fiber would not necessarily be a monomode fiber in the absence of holes. The presence of holes makes it possible to conserve monomode behavior, even at large core radii. Increasing mode diameter while simultaneously increasing monomode core diameter improves overlap.

Figure 4:
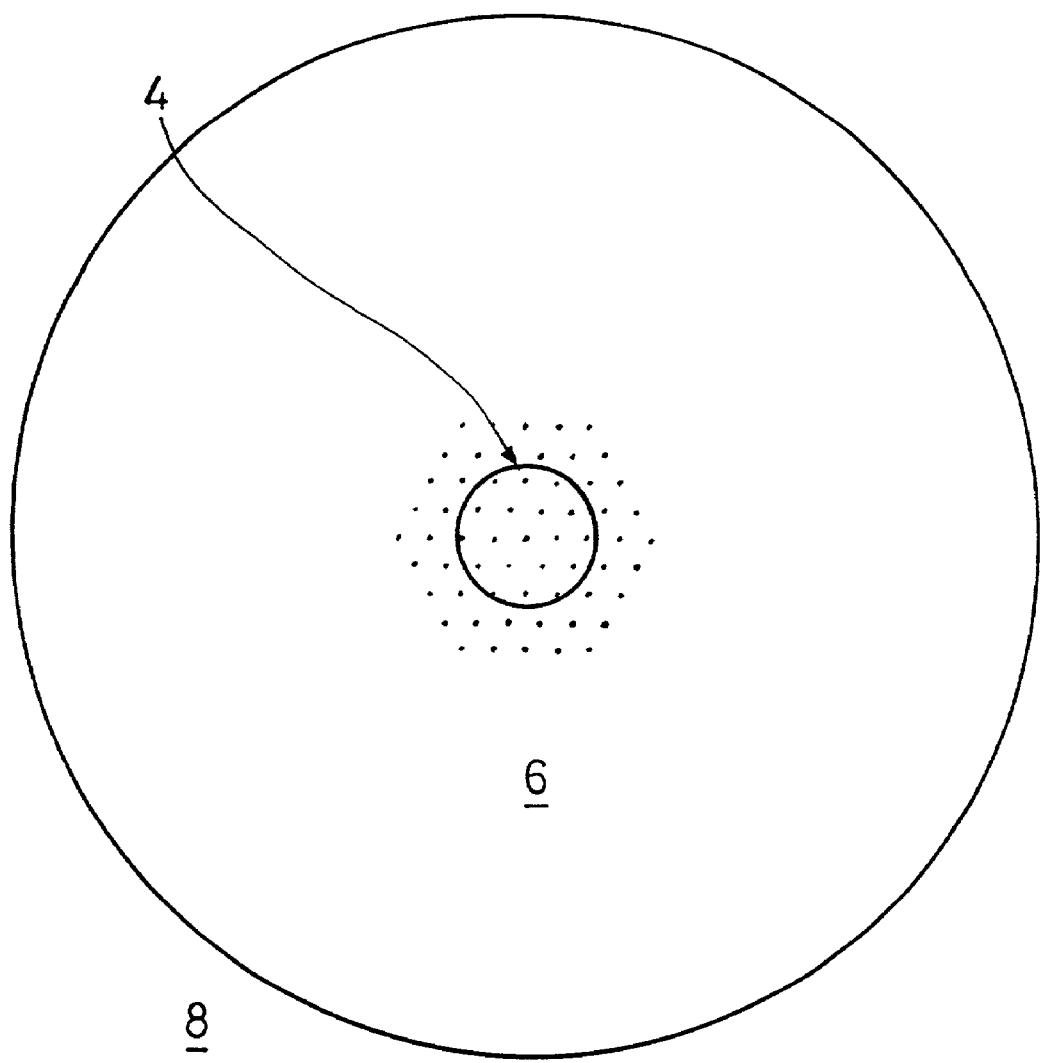
FIGS. 4 to 15 are figures similar to FIGS. 1 to 3, for other fibers.
Figure 10:
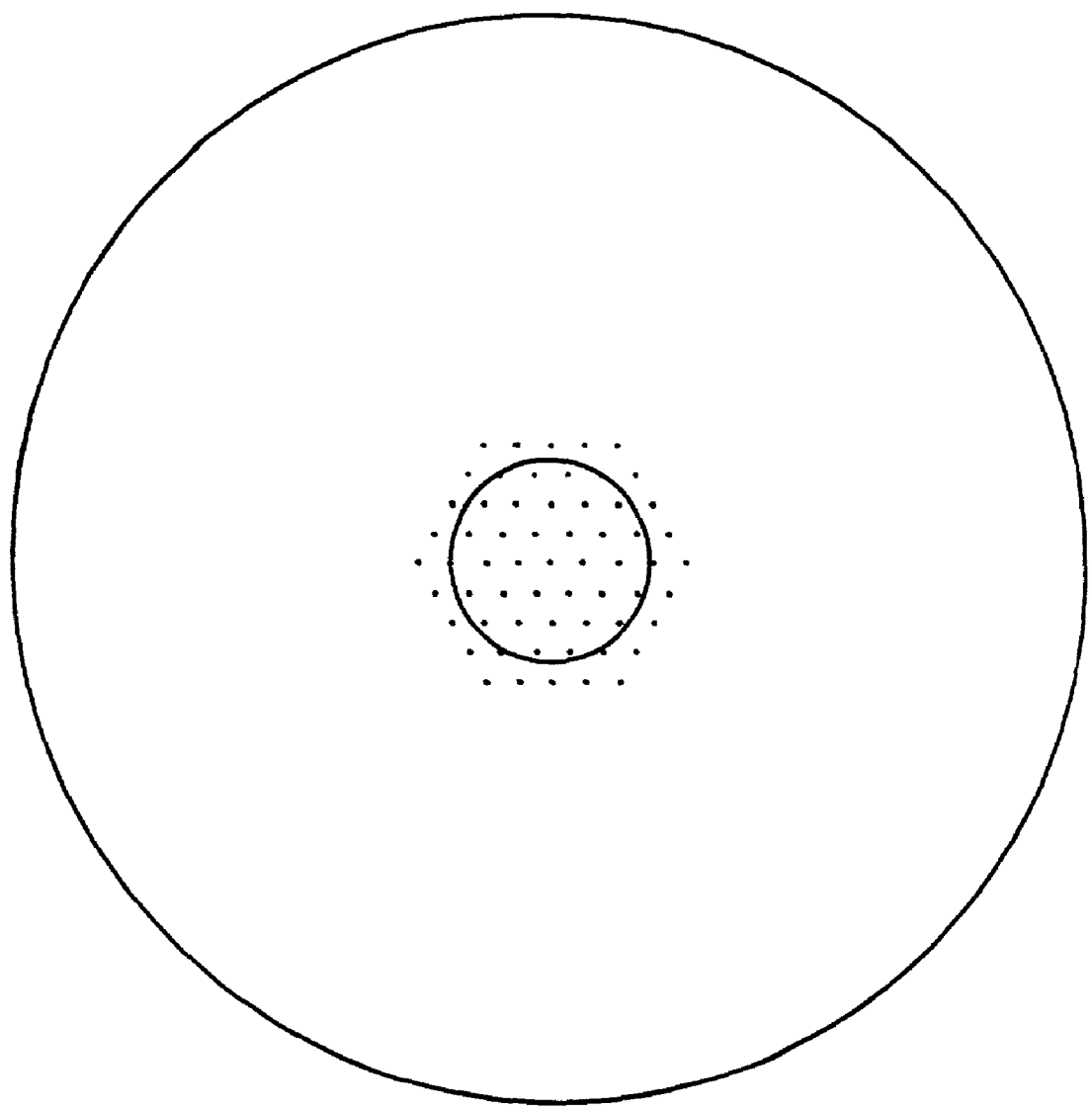

The holes can also extend in the first cladding, as in the example of FIG. 1 or in the examples of FIGS. 4 and 10. Under such circumstances, the holes can occupy a relatively large fraction of the first cladding, as in the example of FIG. 1, or they can be located only in the vicinity of the monomode core, as in the examples of FIGS. 4 and 10. The FIG. 1 variant is particularly advantageous when the holes situated further out have a confinement effect on the signal, or an additional effect of redirecting pumping lights towards the fiber core.

It is also possible to use a distribution of holes similar to that which is described in the patent application filed this same day and entitled "*Fibre optique photonique à forte surface effective*" [A Photonic Optical Fiber with Large Effective Area]. In that case, the term "layer" designates a subset of the matrix of points, which layer in section complies as closely as possible with circular symmetry about the center of the fiber. Successive layers are concentric, sharing a common center with the center of the fiber. In the example of a triangular matrix, a layer typically comprises a set of holes located at the vertices and, where appropriate, on the sides of a hexagon; the first layer presents six points disposed at the vertices of a hexagon whose center is the center of the fiber. In the example given in that application, holes are provided for all of the points in said layer. The second layer is formed by twelve points located at the vertices or in the middles of the sides of a regular hexagon; the length of a side of that hexagon is twice the length of the side of the hexagon forming the first layer; in the example of that patent application, holes are also provided for all of the points in said layer. The third layer is made up of twenty-four points, located at the vertices of a hexagon, and one-third and two-thirds of the way along each side; there are no holes in the third layer. Following layers can be defined in like manner. In the example of that application, each layer is invariant on rotation through an angle of 60° about the center of the fiber; each layer thus constitutes an approximation to a circle, using the points available in the matrix. This definition of a "layer" can be generalized to other types of matrix. Thus, for a square matrix, a layer could be constituted by a set of points lying on the edges of a square or of an octagon; a layer would then be invariant on rotation through an angle of 90° about the center of the fiber. The above-cited document by W. J. Wadsworth et al. presents two "periods" of holes surrounding the center of the fiber; each "period" is circular.

It is then possible to provide for the holes to be distributed as follows:
   the holes of the fiber occupy at least two concentric layers of matrix points centered on the center of the fiber;
   the holes of the fiber occupying a single layer are of the same size and occupy all of the points of the layer; or
   the holes of the fiber occupying at least one layer are of a size different from the size of the holes of the fiber occupying at least one other layer.

In other words, the holes of the fiber present as much radial symmetry as possible, given the geometrical constraints imposed by the matrix of points; this ensures that the polarization of the signal is disturbed little or not at all by the presence of holes in the fiber.

Figure 16:
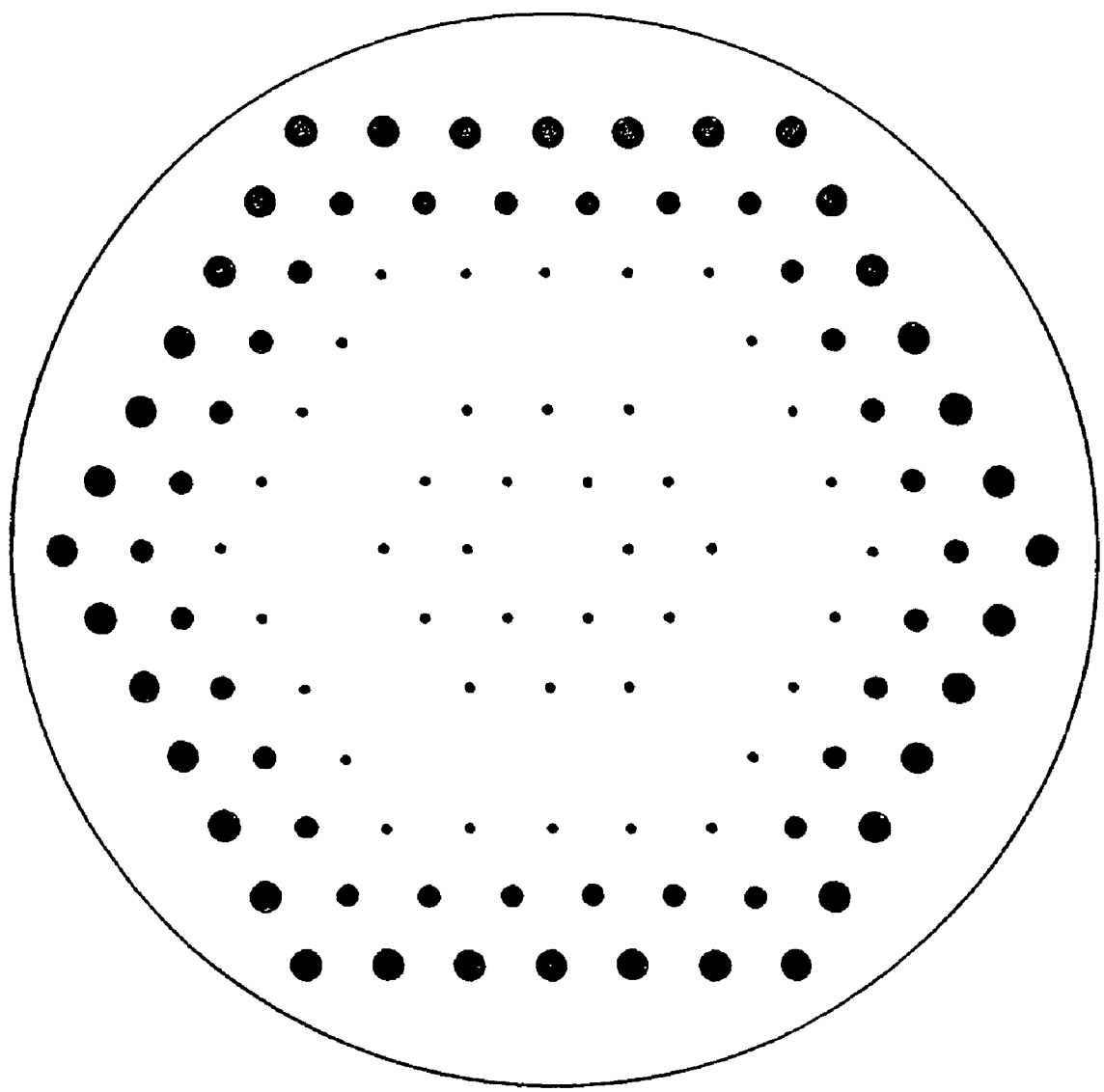
FIG. 16 is a diagrammatic section of a photonic optical fiber constituting another embodiment of the invention.

Nevertheless, the holes can present sizes that vary as a function of fiber radius. At least one layer can be provided without any holes; the effect of this layer is to enable the field to spread within the fiber, and thus increase its effective area and thus increase its mode diameter. It is also possible to require that hole size increases with increasing radius; in other words, the holes in a given layer are larger than the holes in a layer inside it. An embodiment of this is shown in FIG. 16. This increase in hole size with increasing radius serves to improve the effect of light being confined inside the fiber; qualitatively, holes of larger size correspond to a greater decrease in mean index, and it can be considered that a layer of holes forms a kind of index step, with the variation in index increasing with increasing size of the holes.

Conversely, it is also possible to provide for holes of larger size to be provided near the center of the fiber, followed by holes of smaller size, and for the holes of largest size to be located on the outside of the set of holes. Qualitatively, it appears that the field tends to become concentrated in the zones that present the holes of smallest size. The effect of the holes near the center is to move the signal field towards the first cladding; in contrast, the holes on the outside have a confinement effect, qualitatively speaking.

In conclusion, the distribution of holes in the core, and where appropriate, in the first cladding, can vary. It is possible to use the examples given in the figures of the present application, as well as the example given in the figure of the co-filed application, as described in the paragraphs above.

Figure 2:
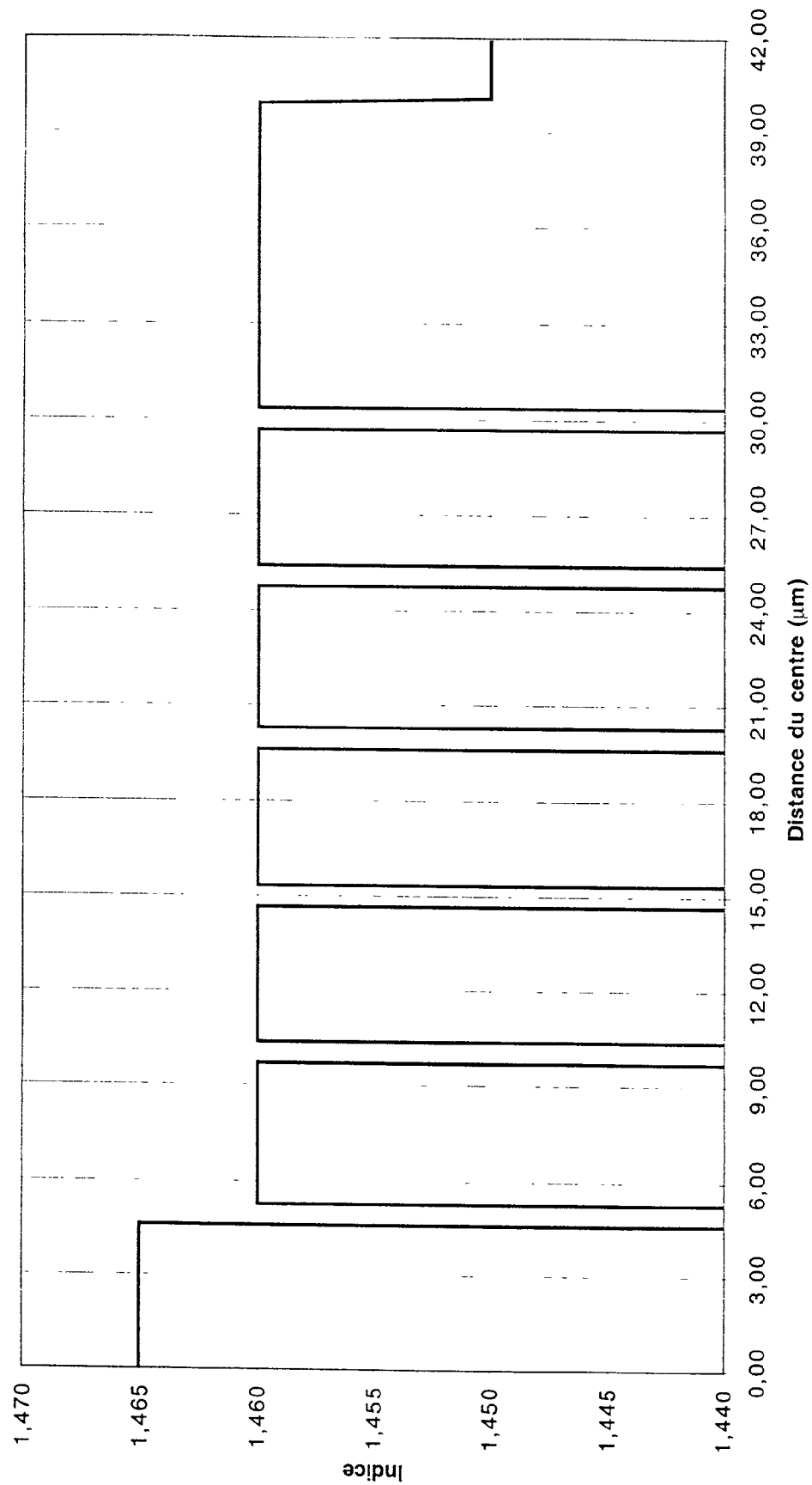
FIG. 2 is a diagram showing the reference index profile for the FIG. 1 fiber.

In terms of dimensions, the holes in the fiber of FIG. 1 are circular and present a diameter of 0.5 micrometers (μm); the distance between the holes in the matrix is 5 μm; the holes in FIG. 1 are distributed over six layers, each layer being in the form of a hexagon. FIG. 2 shows the index profile of the FIG. 1 fiber; in conventional manner, distance from the center of the fiber is plotted along the abscissa axis, and the index of the material constituting the fiber is plotted up the ordinate axis; it should be observed that the graph of FIG. 2 represents index along a radius of the fiber that passes through the vertices of the regular hexagons as formed by the holes. Thus, this figure shows not only the index of the material, but also the locations of the holes which are marked by an index of value 1. Given the scale of the figure along the ordinate axis, only a portion of the curve is shown, and indices close to 1 are not visible in the figure. The figure therefore does not show the mean index of the fiber. FIG. 2 shows that the core of the fiber extends outside to a radius $r_1$ of 5 μm and presents an index difference $\Delta n_1$ of $5 \times 10^{-3}$ relative to the index of the first cladding. The first cladding extends between radii $r_1$ and $r_2$, where $r_2$ is 40 μm; it presents an index difference $\Delta n_1$ of $10 \times 10^{-3}$ relative to the index of the second cladding. The second cladding extends beyond the radius $r_2$; by way of example, it can be constituted by non-doped silica. The figure also shows the index drops that correspond to the holes, at radii of 5 μm, 10 μm, 15 μm, 20 μm, and 25 μm.

Figure 3:
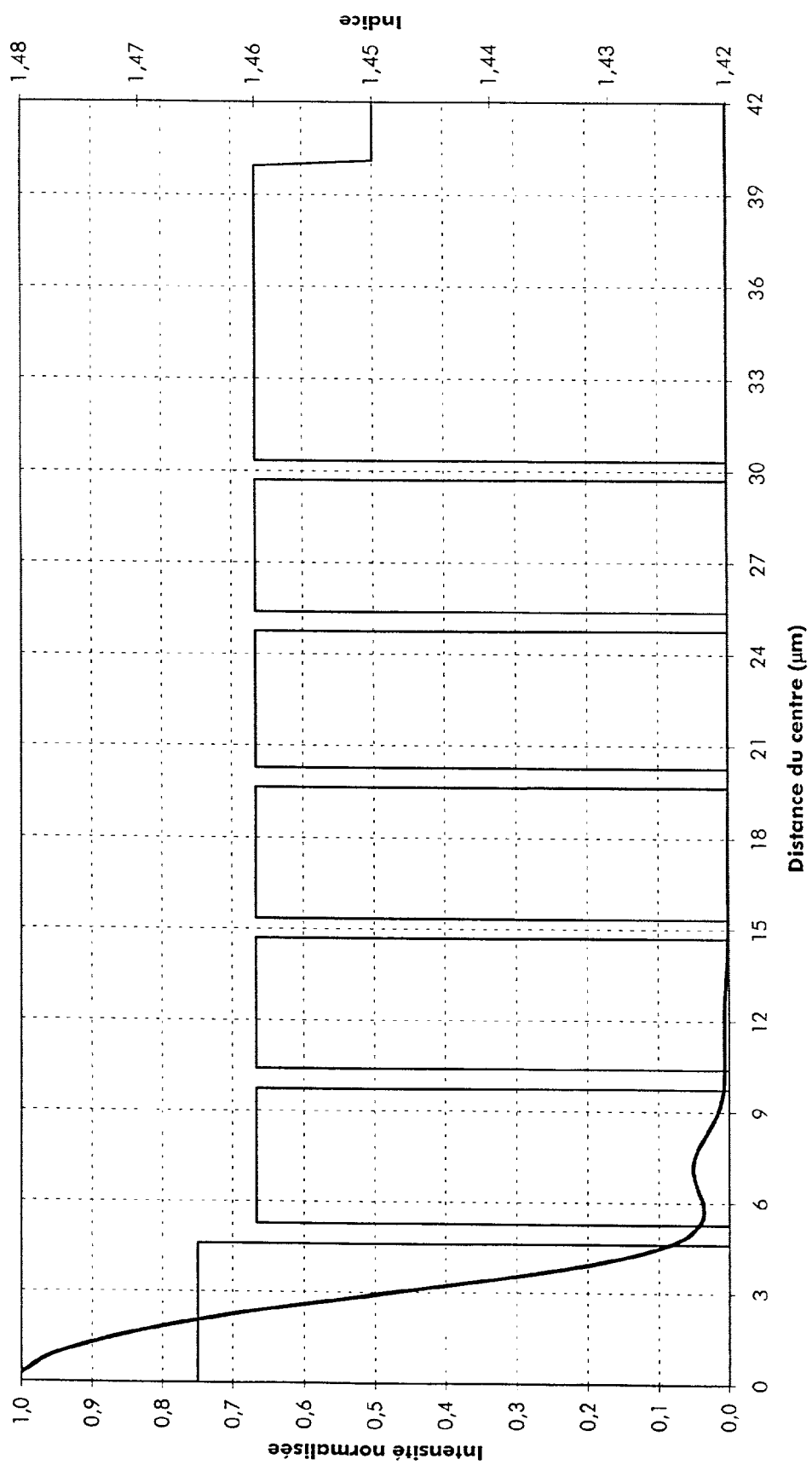
FIG. 3 plots signal intensity as a function of radius for the FIG. 1 fiber.

FIG. 3 plots signal intensity as a function of radius for the FIG. 1 fiber; radius is plotted along the abscissa axis as in FIG. 2, and signal intensity is plotted up the ordinate axis, relative to the maximum intensity of the signal. The index profile is also plotted on FIG. 3, with index values being labeled up the right-hand ordinate in the figure. In the figure, it can be seen that the intensity of the signal remains at high values, well outside the diameter of the fiber core; in this example, the mode diameter is 11.5 μm (where mode diameter is at 1/e, calculated in conventional manner for a Gaussian approximation of intensity). In this case, 78% of the energy lies inside the circle whose diameter matches this mode diameter; 85% of the energy lies within a circle of 14 μm diameter; 90% of the energy lies within a circle of 16 μm diameter, and 95% of the energy lies within a circle of 21 μm diameter.

By way of comparison, it would also be possible, using the same hole distribution, to provide an index profile satisfying the following parameters:
   $r_1 = 5$ μm;
   $\Delta n_1 = 4.5 \times 10^{-3}$;
   $r_2 = 25$ μm; and
   $\Delta n_2 = 30 \times 10^{-3}$.

Under such circumstances, the mode diameter would typically be about 11.5 μm, with overlap close to 5%.

Also by way of comparison, a fiber presenting a hole distribution of the kind proposed in the application filed this same day would have a mode diameter of about 20 μm for the same index profile of the material.

In the example of FIG. 1, the dopant used is erbium, at a concentration close to 1000 ppm. As explained above, it is possible to use doping within a circle of diameter close to the mode diameter, i.e. 11.5 µm in this example. It would also be possible to use ring doping, in this example in the range 9 µm to 16 µm; the inner limit is slightly smaller than the diameter of the monomode core, while the outer limit corresponds to the diameter of the circle which contains 90% of the energy.

The invention thus enables overlap to be improved compared with a double-clad fiber that does not have any holes. By way of comparison, a double-clad fiber with circular cladding can present overlap of about 1% for a monomode core diameter of about 8 µm and first circular cladding with a diameter of 100 µm. Other things being equal, the presence of holes as proposed in the examples of this application increases overlap, which can achieve values of the order of 1.3%. The presence of holes thus increases overlap by close to 30%.

For a fiber with first cladding shaped in a rose petal configuration, the overlap is typically about 3%. The presence of holes as proposed in the examples makes it possible to increase overlap to values close to 4%, i.e. likewise an increase of about 30%. This increase gives rise to a corresponding increase in amplification efficiency or in the laser effect.

The FIG. 1 fiber can be used in any conventional amplifier or laser configuration; it is possible to use pumping that is co-directional or contra-directional, or indeed it is possible to use both kinds of pumping.

Figure 5:
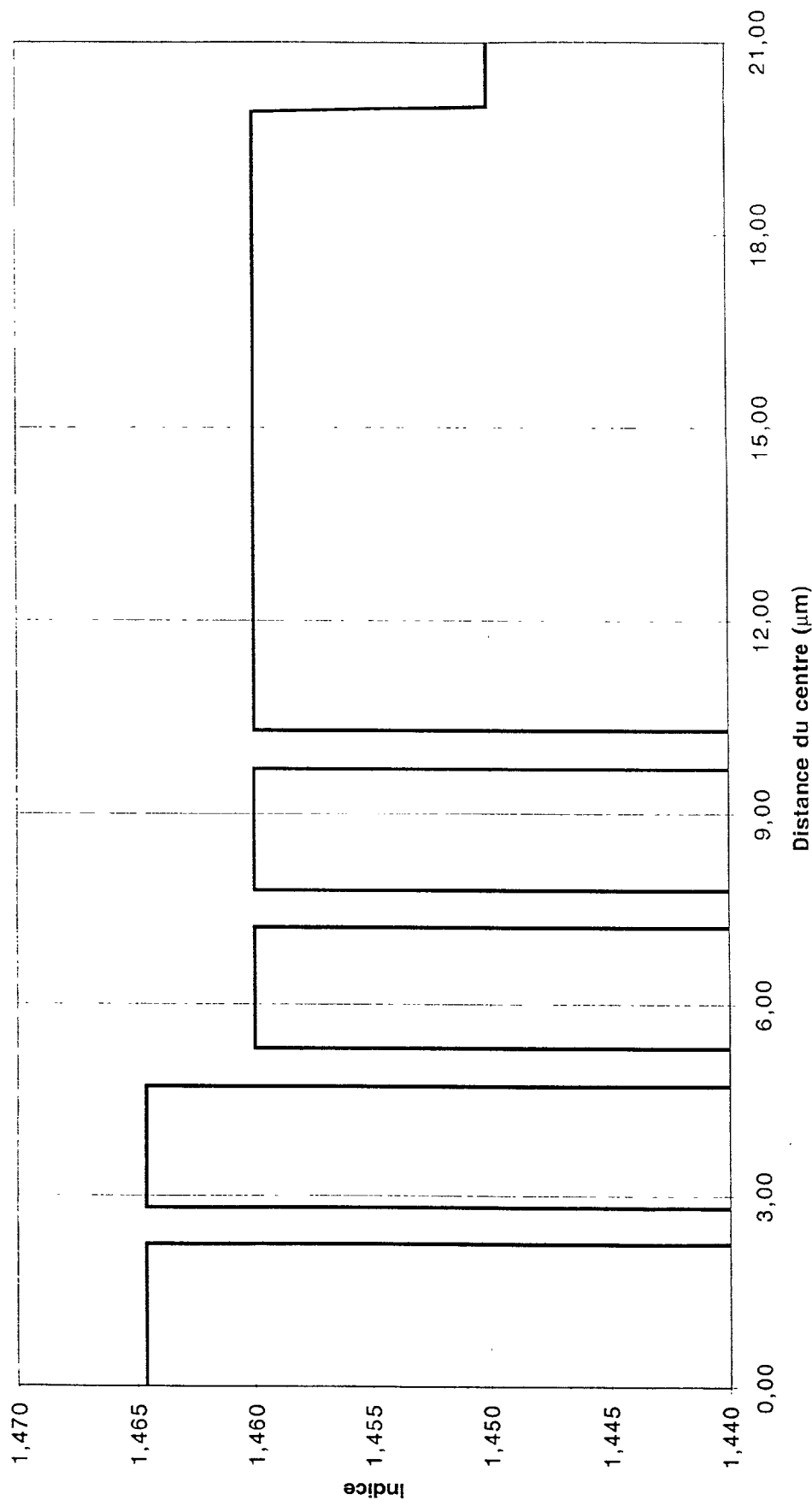
Figure 6:
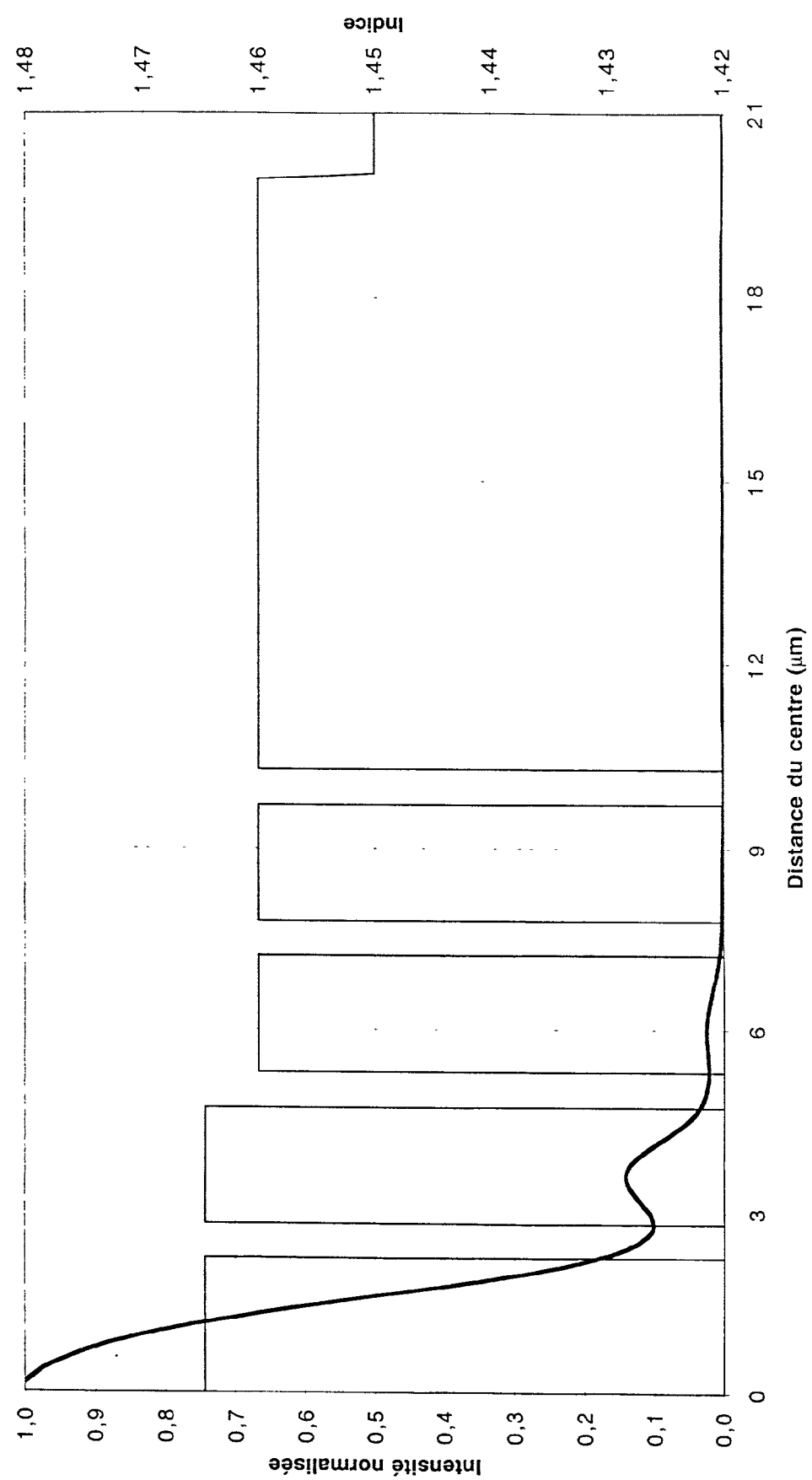

FIGS. 4 to 6 are figures similar to FIGS. 1 to 3, but for a different fiber. In the FIG. 4 example, the holes are distributed inside the monomode core and over a fraction of the first cladding adjacent to said monomode core. The holes have a diameter of 0.5 µm, and they are spaced apart by a distance of 2.5 µm. The profile is similar to that of FIG. 1, with $r_1$ =5 µm, $\Delta n_1$ =4.5×10$^{-3}$, $r_2$ =20 µm and $\Delta n_2$ =10$^{-3}$.

The propagation characteristics of the FIG. 4 fiber are as follows: at 1550 nm, the fiber presents chromatic dispersion of 3.41 picoseconds per nanometer kilometer (ps/(nm.km)), and a chromatic dispersion slope of 0.10 ps/(nm$^2$.km). At the same wavelength, it presents an effective area of 55.4 µm$^2$.

Figure 8:
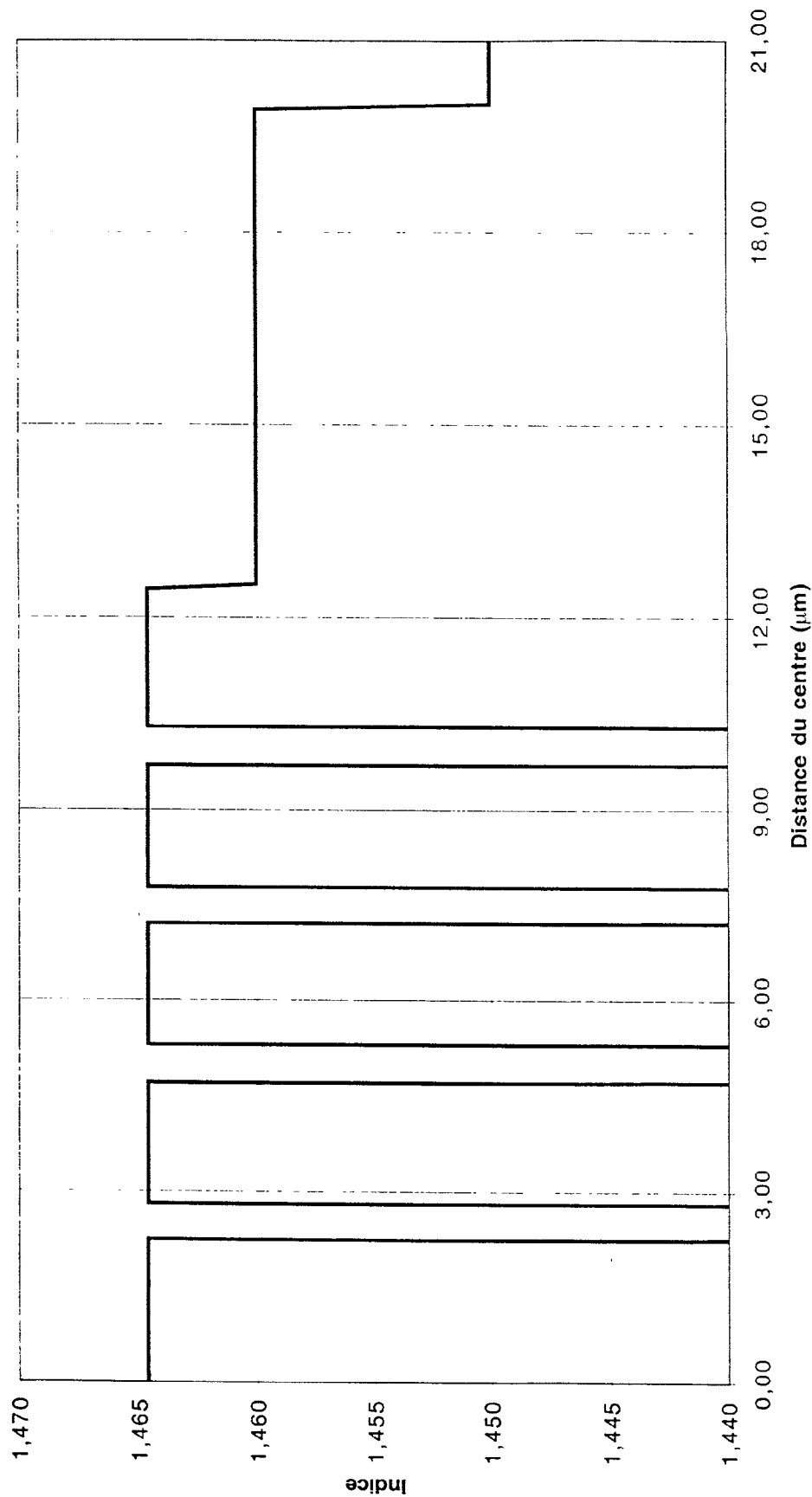
Figure 9:
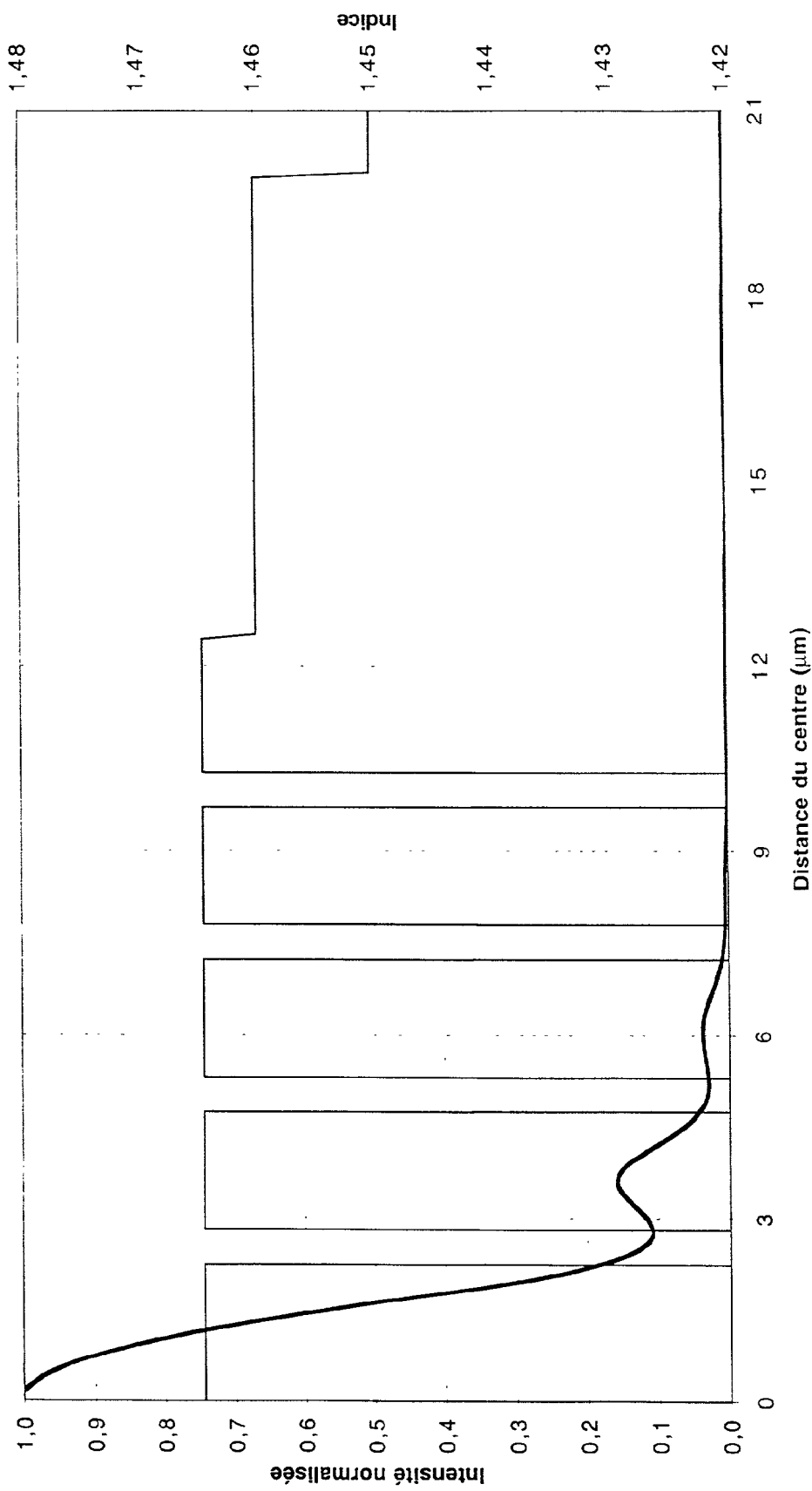

FIGS. 7 to 9 are figures similar to FIGS. 1 to 3, for a different fiber. In the example of FIG. 7, the holes are located solely within the core of the fiber, in a distribution analogous to that of FIG. 1. The core of the fiber presents a radius $r_1$ of 12.5 µm, an index difference $\Delta n_1$ of 4.5×10$^{-3}$ relative to the index of the first cladding; the first cladding extends out to a radius $r_2$ of 20 µm and presents an index difference $\Delta n_2$ of 10×10$^{-3}$ relative to the index of the second cladding. In this example, the mode diameter of the signal is 9 µm, and it is greater than the mode diameter of the FIG. 4 fiber.

The propagation characteristics of the FIG. 7 are as follows: at 1550 µm, the fiber presents chromatic dispersion of 8.50 ps/(nm.km), and a chromatic dispersion slope of −2.8 ps/(nm$^2$.km). At the same wavelength, it presents an effective area of 63.5 µm$^2$.

Figure 11:
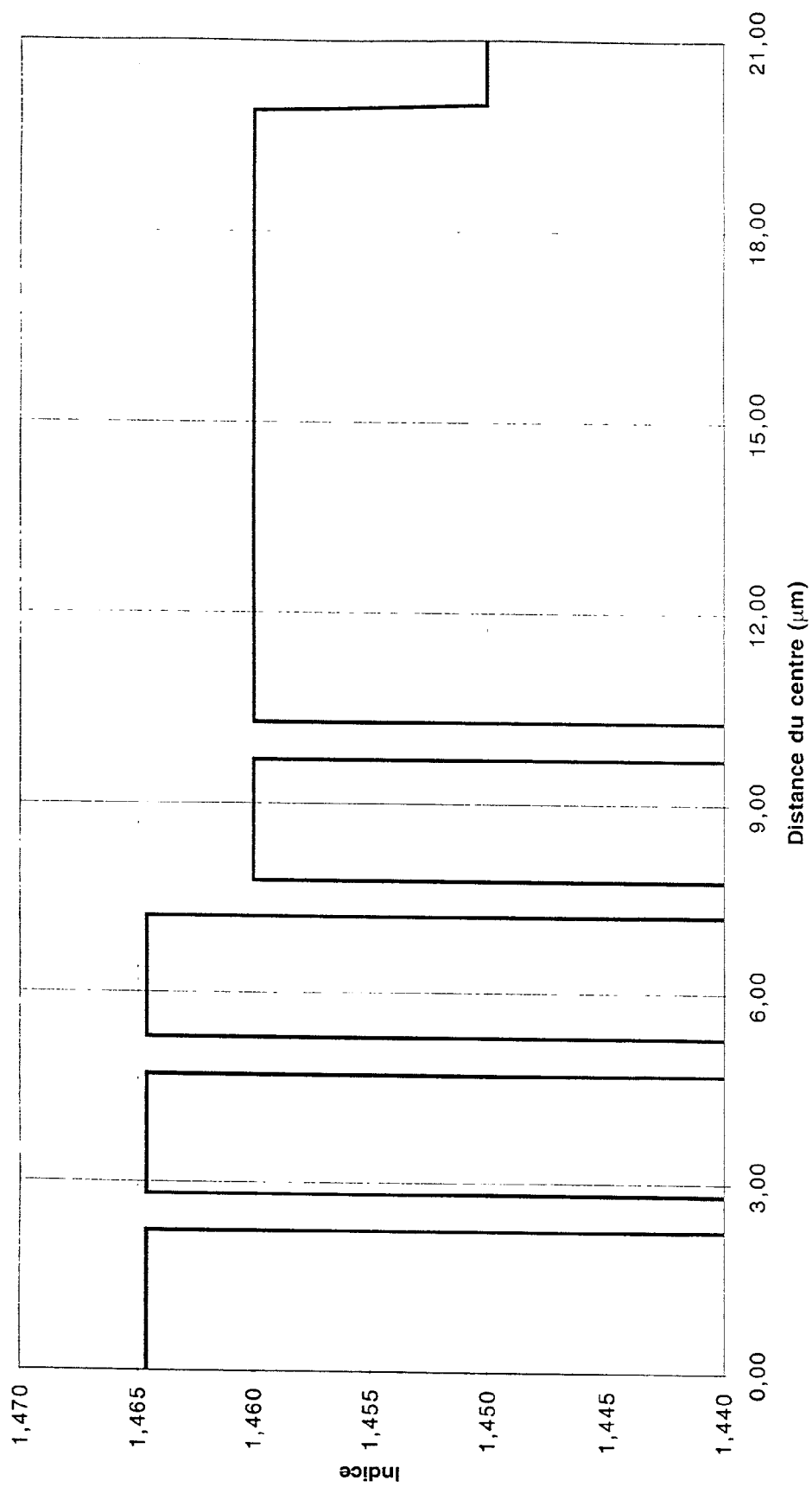
Figure 12:
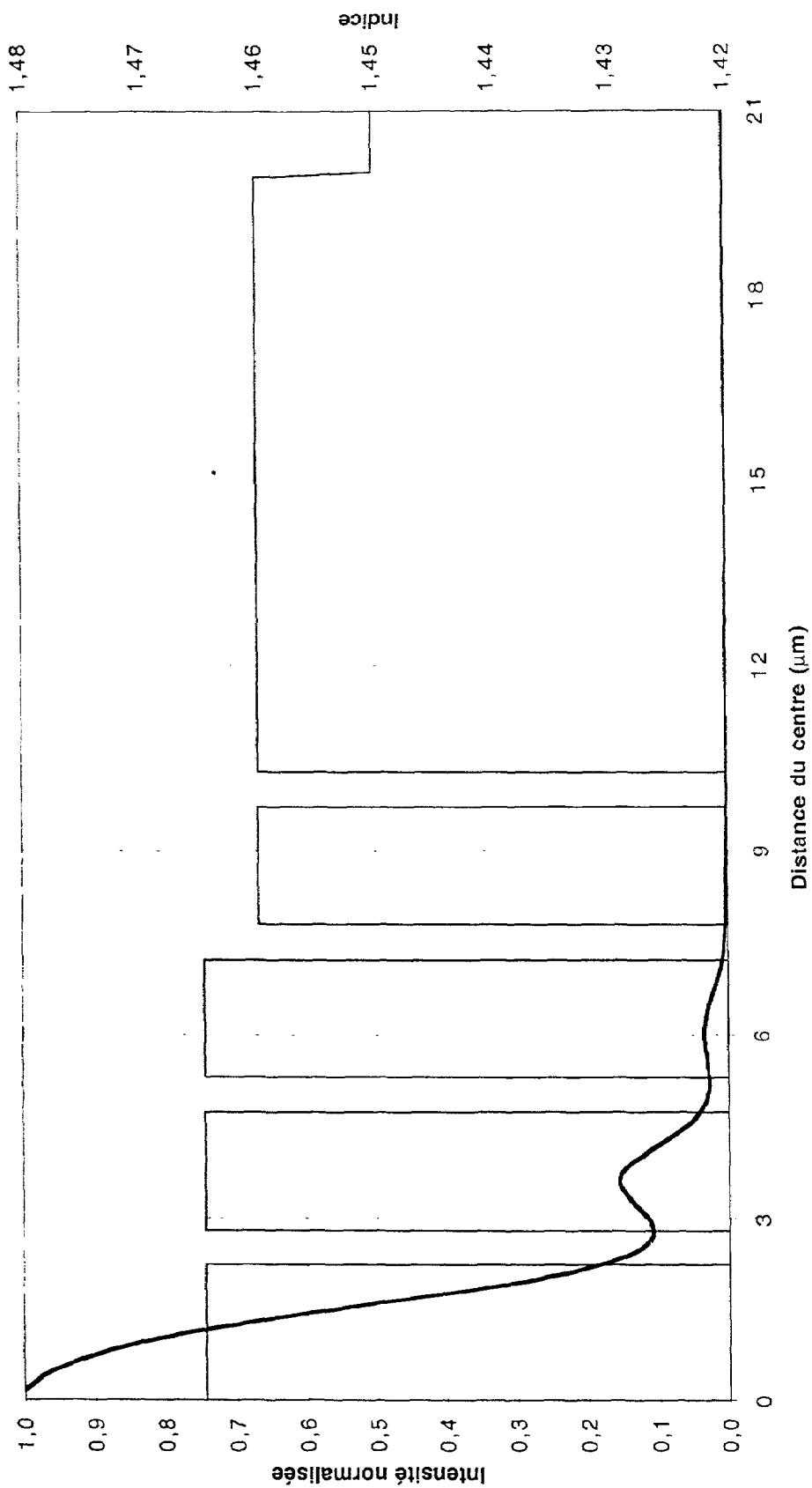

FIGS. 10 to 12 are figures similar to FIGS. 1 to 3, for a third fiber. In the example of FIG. 10, the holes are distributed as in FIG. 1, but the radius of the core is larger; nevertheless, the holes are distributed as in FIG. 1, both in the core and in the cladding. The index profile of FIG. 11 differs from that of FIG. 5 in that the fiber core presents a radius $r_1$ of 7.5 µm. In this example, the mode diameter of the signal is likewise 9 µm.

The propagation characteristics of the FIG. 10 fiber are as follows: at 1550 µm, the fiber presents chromatic dispersion of 5.0 ps/(nm.km), and a chromatic dispersion slope of −0.11 ps/(nm$^2$.km). At the same wavelength, it presents an effective area of 61.1 µm$^2$.

Figure 14:
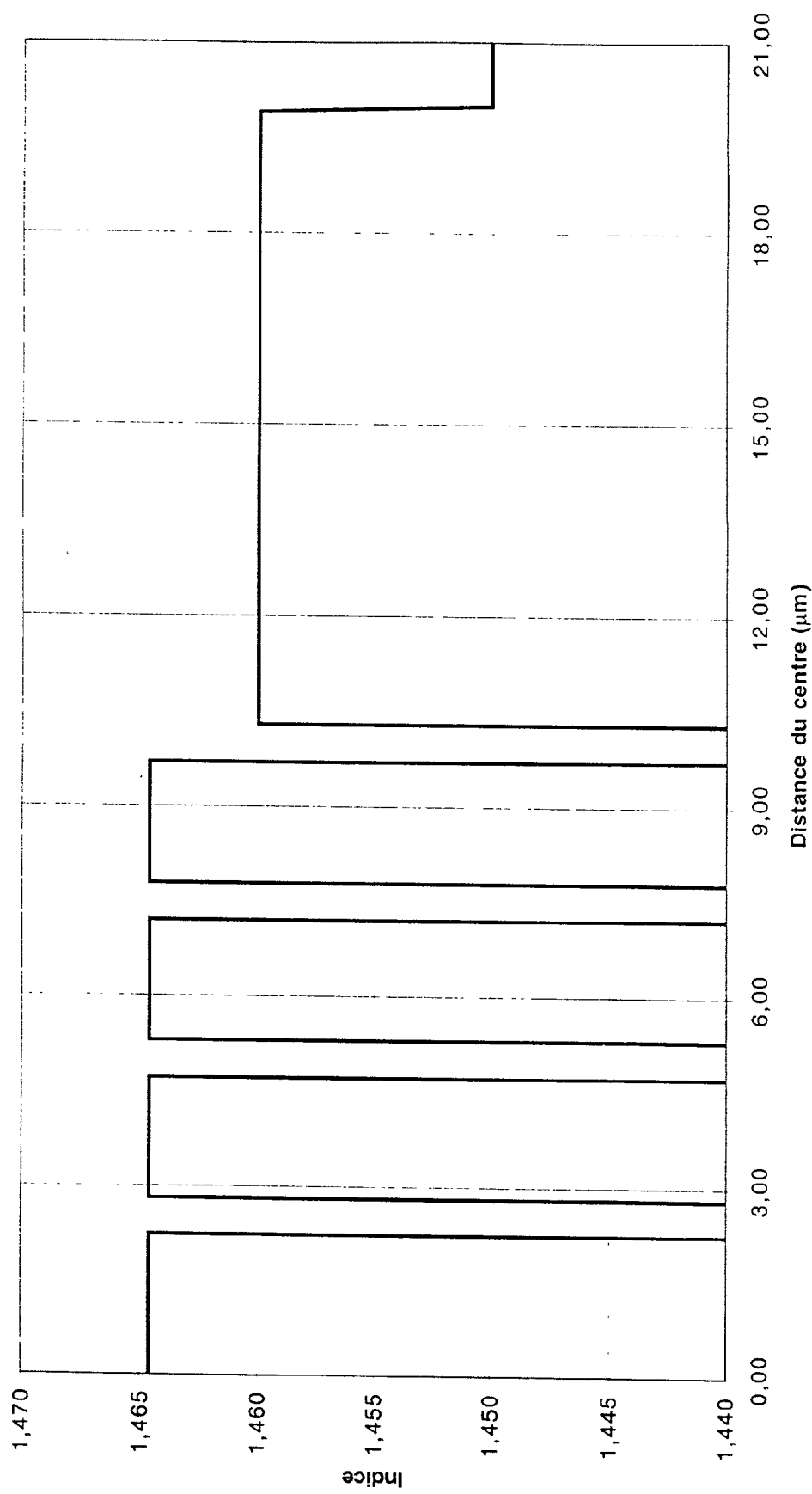
Figure 15:
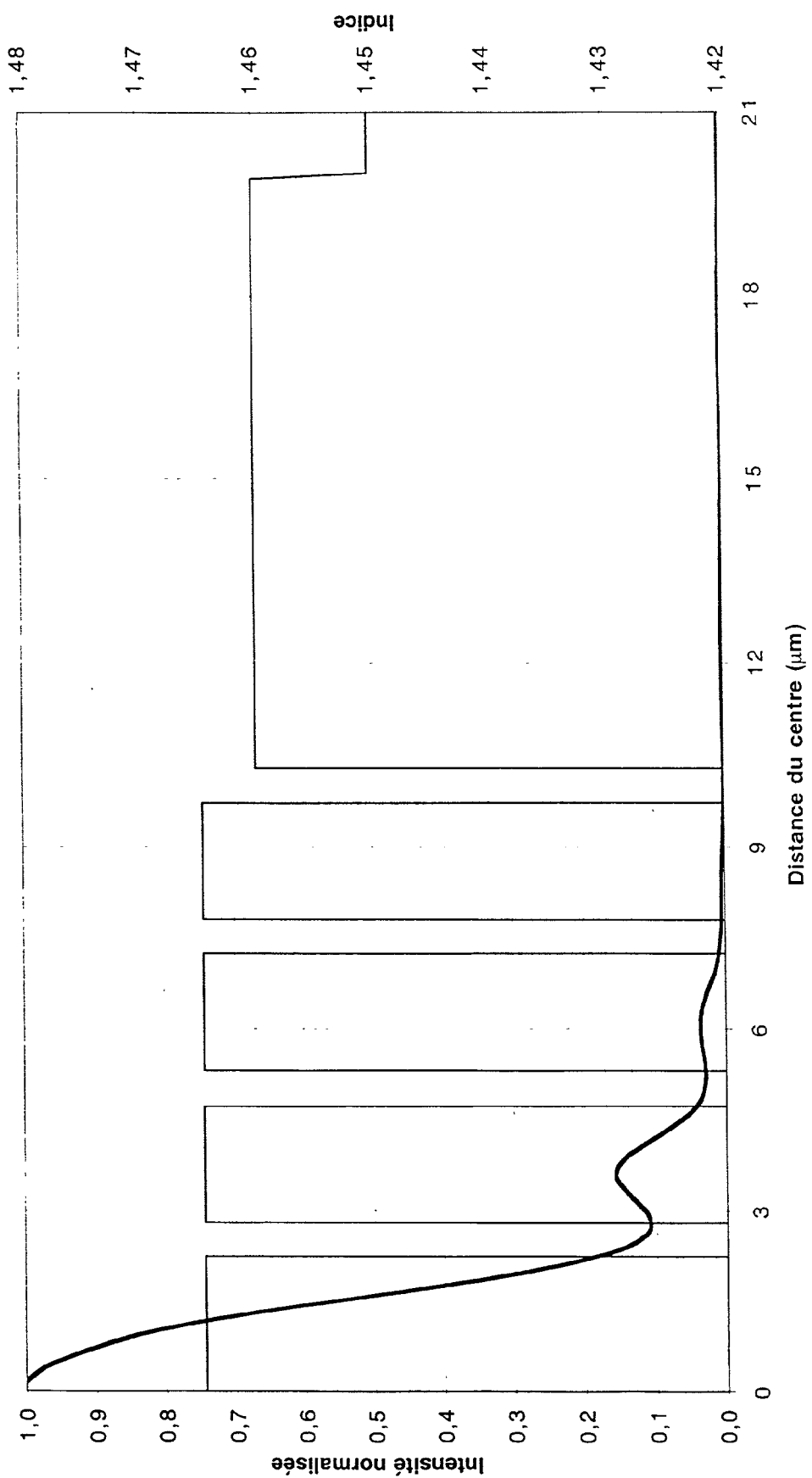

FIGS. 13 to 15 are figures similar to FIGS. 1 to 3 for a fourth fiber. In the example of FIG. 13, the holes are distributed as in FIG. 4, but the core radius is larger; the holes are distributed throughout the core of the fiber, but they do not extend into the first cladding. The index profile of FIG. 14 differs from that of FIG. 5 in that the fiber core presents a radius $r_1$ of 10 µm. In this example, the mode diameter of the signal is 9 µm.

The propagation characteristics of the FIG. 13 fiber are as follows: at 1550 nm, the fiber presents chromatic dispersion of 5.79 ps/(nm.km), and a chromatic dispersion slope of 0.11 ps/(nm$^2$.km). At this same wavelength, it presents an effective area of 63.4 µm$^2$.

The fibers described above are advantageously used as amplification fibers in optical amplifiers. Compared with conventional double-clad fibers, they present better overlap between the signals and the pump, thereby providing better amplification efficiency. Typically, the amplification efficiency in a fiber of the kind described herein is 30% greater than the amplification efficiency in a corresponding state-of-the-art fiber.

Naturally, it is possible to implement variations over the examples given above; thus, the holes in the various fibers are described as being circular; however, it is also possible to use holes of some other shape. The second cladding could be constituted by a material that is doped instead of using silica, thereby offsetting the entire index profile. It is also possible to combine the above examples with prior art solutions, for example a first cladding that is in the shape of petals or in some other shape, so as to direct pumping light towards the core of the fiber. The outer cladding has little effect on the operation of the fibers given by way of example; its index and its size can be varied.

The invention claimed is:

1. A double-clad photonic optical fiber presenting:
   a fiber core, first cladding surrounding the fiber core, and second cladding surrounding the first cladding;
   at least one hole in the fiber core; and
   doping using a rare earth ion, at least in the core of the fiber,
   wherein a material composition of the first cladding is different from a material composition of the second cladding.

2. The fiber of claim 1, presenting a plurality of holes in the core and in the first cladding.

3. The fiber of claim 1, wherein the mode diameter of a signal injected into the fiber core is greater than the diameter of the core.

4. The fiber of claim 1, wherein the doping extends over a disk.

5. The fiber of claim 1, wherein the doping extends in a ring.

6. The fiber of claim 5, wherein the ring covers the interface between the fiber core and the first cladding.

7. The fiber of claim 1, wherein the holes are disposed in a triangular matrix of points.

8. The fiber of claim 7, wherein it does not present a hole on its axis.

9. The fiber of claim 1, wherein the holes are of size that increases with increasing distance from the axis of the fiber.

10. The fiber of claim 1, wherein a refractive index of the fiber core is higher than a refractive index of the first cladding, and the refractive index of the first cladding is higher than the refractive index of the second cladding.

11. The fiber of claim 1, wherein said first cladding is doped differently from said second cladding.

12. The fiber of claim 11, wherein the second cladding is not doped.

13. The fiber of claim 1, wherein a solid material composition of the first cladding is different from a solid material composition of the second cladding.

14. The fiber of claim 1, wherein the doping extends over a continuous disk region that includes the core and a portion of the first cladding.

15. The fiber of claim 1, wherein the doping extends in a ring region that includes an outer portion of the core such that a center portion of the core is not doped.

16. The fiber of claim 15, wherein the doping extends in a portion of the first cladding.

17. The fiber of claim 1, wherein an optical interface between the first cladding and second cladding exists at locations having no holes.

18. The fiber of claim 17, wherein the optical interface defines a change in refractive index.

19. An amplifier comprising a double-clad photonic optical fiber, together with at least one pump injected into the first cladding, the optical fiber presenting:

a fiber core, first cladding surrounding the fiber core, and second cladding surrounding the first cladding;

at least one hole in the fiber core; and doping using a rare earth ion, at least in the cure of the fiber, wherein a material composition of the first cladding is different from a material composition of the second cladding.

20. A fiber laser comprising a double-clad photonic optical fiber, together with at least one pump injected into the first cladding, the optical fiber presenting:

a fiber core, first cladding surrounding the fiber core, and second cladding surrounding the first cladding;

at least one hole in the fiber core; and doping using a rare earth ion, at least in the core of the fiber, wherein a material composition of the first cladding is different from a material composition of the second cladding.

* * * * *